United States Patent [19]

Johansson

[11] 4,352,241
[45] Oct. 5, 1982

[54] DEVICE RELATING TO A CIRCULAR SAW BLADE OF CENTERLESS TYPE

[76] Inventor: Mats A. Johansson, Ekliden 6, S-667 00, Forshaga, Sweden

[21] Appl. No.: 238,824

[22] Filed: Feb. 27, 1981

[30] Foreign Application Priority Data

Mar. 25, 1980 [SE] Sweden ................................. 8002265
Oct. 14, 1980 [SE] Sweden ................................. 8007185

[51] Int. Cl.³ .............................................. B27B 5/14
[52] U.S. Cl. .................................... 30/123.4; 30/389;
51/267; 83/169
[58] Field of Search ..................... 30/123.3, 389, 123.4;
51/267; 83/169

[56] References Cited

U.S. PATENT DOCUMENTS

| | | | |
|---|---|---|---|
| 2,372,699 | 4/1945 | Wiken | 83/169 X |
| 2,748,810 | 6/1956 | Strunk | 30/123.4 |
| 2,972,363 | 2/1961 | Santilli | 30/389 |
| 3,127,886 | 4/1964 | Miller | 51/267 X |
| 3,135,304 | 6/1964 | Breer | 30/389 |
| 3,156,274 | 11/1964 | Golick | 83/169 X |

FOREIGN PATENT DOCUMENTS 645828  6/1979  U.S.S.R. ................................. 51/267

Primary Examiner—Jimmy C. Peters
Attorney, Agent, or Firm—Murray and Whisenhunt

[57] ABSTRACT

A circular saw blade of centerless type which has a sawing depth greater than the radius of the circle, comprises an annular blade and at least one central disc provided inside the annular blade. The central disc contains at least one conduit or passage for a fluid, e.g. for a coolant or a flushing agent to the part of the disc which lies within the region of the maximum sawing depth.

10 Claims, 8 Drawing Figures

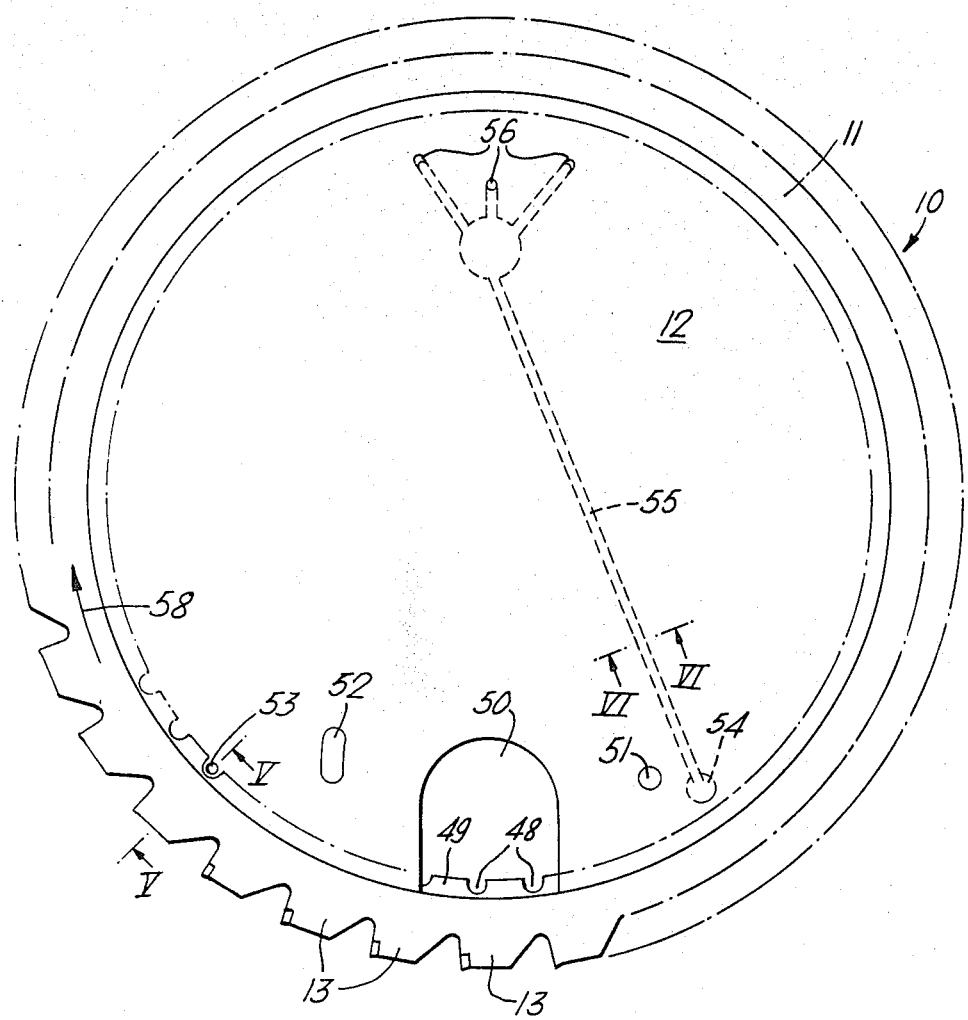

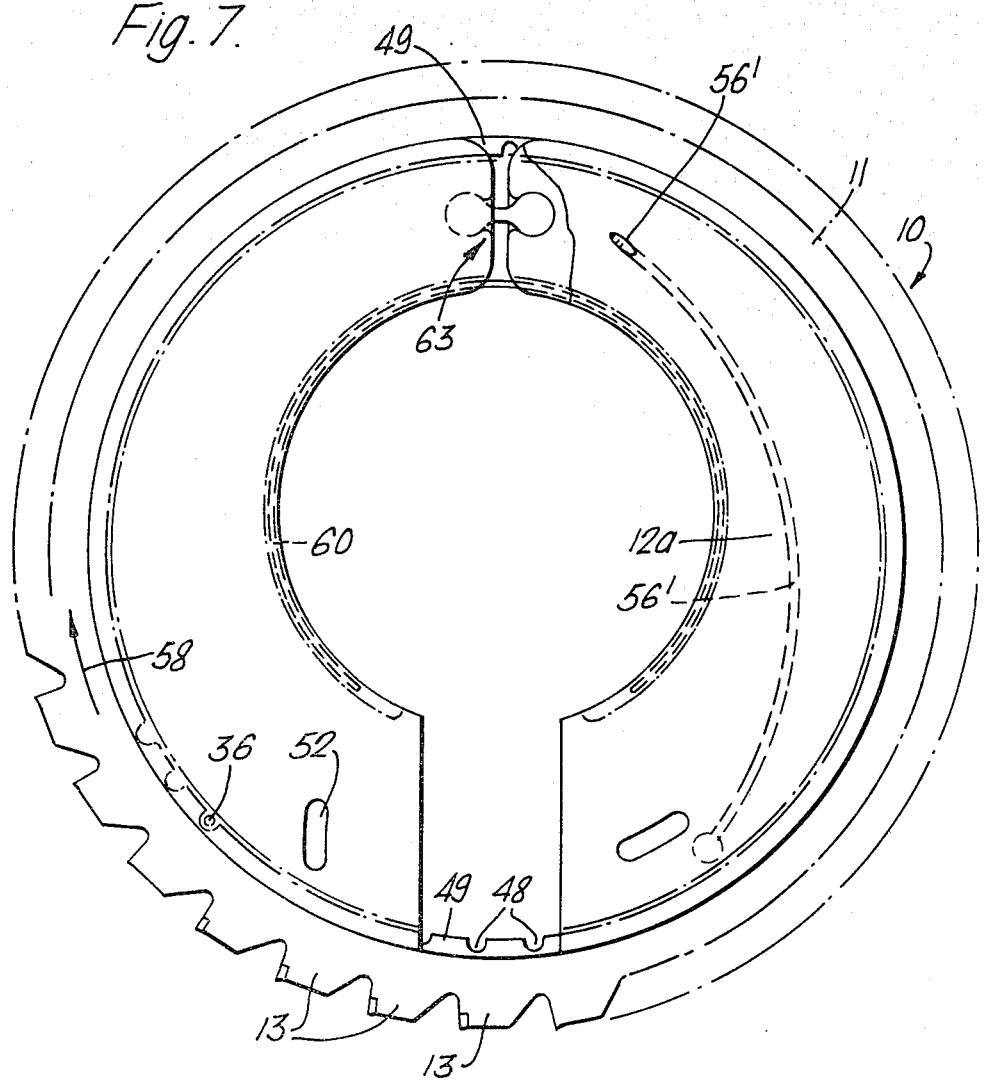

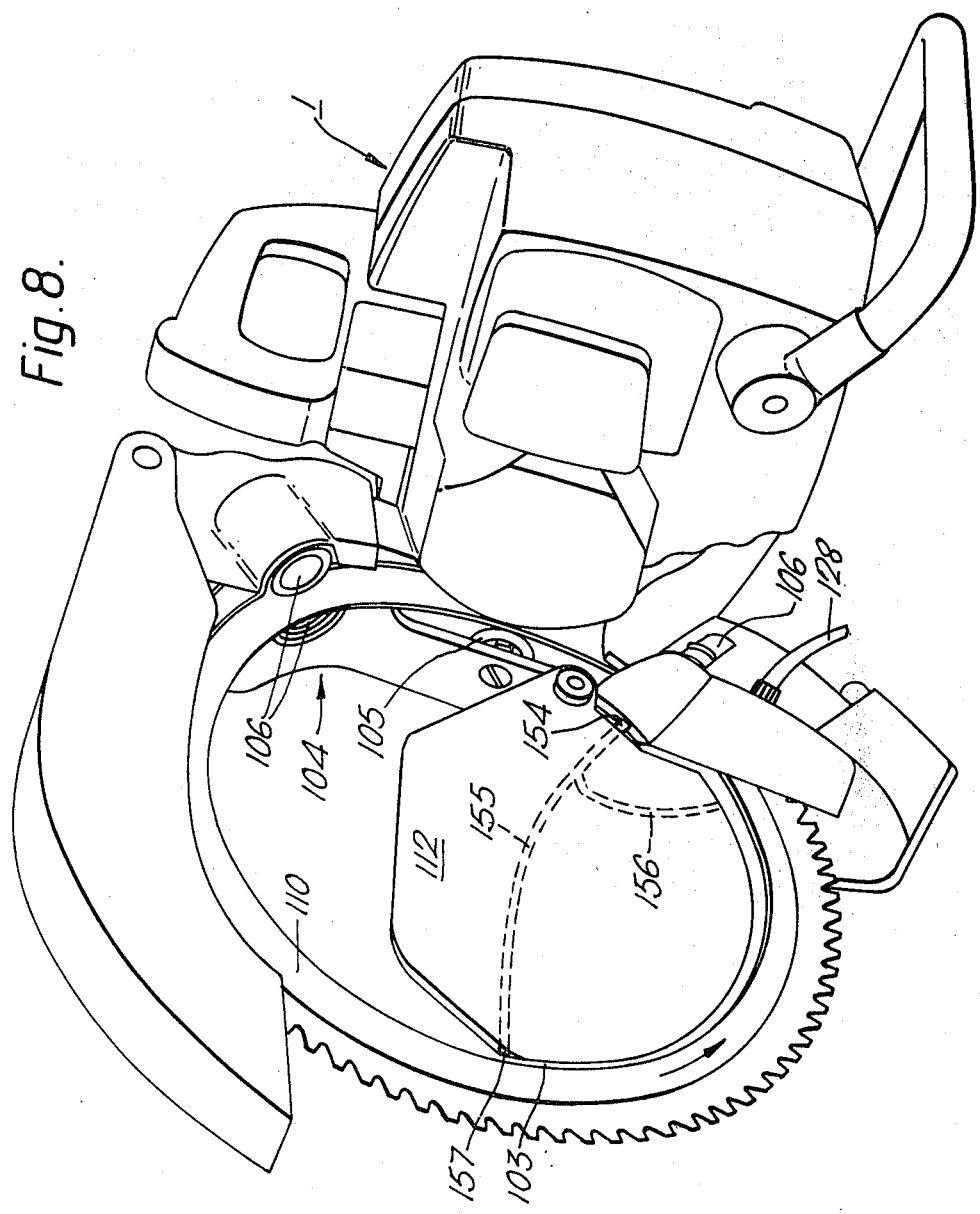

DEVICE RELATING TO A CIRCULAR SAW BLADE OF CENTERLESS TYPE

FIELD OF INVENTION

This invention relates to a circular saw blade of centerless type with a sawing depth greater than the radius of the circle, comprising an annular blade and at least one centre disc provided inside the annular blade. More particularly does the invention relate to the problem of introducing a fluid, e.g. a coolant and/or a flushing agent into the kerf produced by the saw blade. The invention also relates to mounting means for holding the central disc.

BACKGROUND ART

That which primarily characterizes annular saws is that they lack a central shaft as a result of which the sawing depth is greater than the radius of the circle. Portable sawing machines have therefore been able to be developed for sawing up to a sawing depth of about 30 cm. The annular saw has therefore involved a novel idea when it is a question of mobile cross-cutting saws for qualified applications. Examples of use are in fire protection for sawing through roofs, walls and floors regardless of whether there are nails or other iron objects; sawing into motor-car bodies and other sheet-metal and iron constructions; sawing concrete pipes, sawing up asphalt, making holes in concrete and light-weight concrete walls and so on.

A problem which is encountered when sawing in objects and materials of the above mentioned kind has to do with the extensive generation of heat. Another problem concerns the removal of saw dust and other particles from the kerf produced by the saw blade. These problems may arise also for conventional circular saws but they are pronounced in the present field not only because of the heavy duty of the saw but also of the fact that the kerf may be made deeper than by conventional circular saws of the same dimensions and therefore not readily accessible for introduction of fluids by conventional means.

DISCLOSURE OF INVENTION

Now, therefore a primary object of the present invention is to bring about an improvement in this technical field with the aim at readily and efficiently introducing the fluid, e.g. a coolant or flushing agent, into the kerf produced by the saw blade.

Another object is to offer a device which is easy to manufacture and which is reliable in operation.

These and other objects which will be apparent from the following can be achieved in that the central disc contains at least one conduit or passage for a fluid, e.g. for a coolant or flushing agent to the part of the disc which lies within the region of the maximum sawing depth. Preferably said conduit or passage extends through the disc in a plane which is parallel to its side surfaces from a first point outside the region of the maximal sawing depth to a second point which lies within said region, wherein the disc in said first point has an inlet to the passage through the disc and in said second point has an outlet for said fluid, e.g. for the transportation of a coolant or a flushing agent in situ into the kerf produced by the saw blade.

According to a preferred embodiment the central disc consists of a laminated material comprising at least two united laminations. Herein the said passage may be obtained by a groove provided in one of the laminations prior to uniting the laminations. If the number of laminations is at least three, said passage may be obtained by means of a groove provided in an inner layer of such laminated material. If the number of laminations, however, is only two, said groove may be provided in one of the laminations in that surface which is faced to the other lamination.

The conduit or passage through the disc can, however, be brought about also by other means than by means of a groove in a laminated material. For example, regardless the disc is laminated or not, the conduit or passage may consist of a tube provided in a groove in the disc, wherein the tube has an outer dimension in the direction perpendicular to the side surface of the disc which is not greater than the depth of the groove. Further the conduit may be formed by means of a strip or a corresponding means covering a groove provided in one of the side surfaces of the disc such that a passage is formed between the strip and the bottom of the groove.

The invention also relates to the mounting means provided to hold the central disc, wherein a conduit extends through the mounting means to supply said fluid to the conduit or passage extending through the central disc.

The device according to the invention can be combined with various means for mounting, guiding and driving the annular saw blade. Without being restricted to any particular means in this respect, the annular saw blade can be journaled in a peripheric groove of the central disc. It is, however, very well possible to journal the annular saw blade by conventional means, as well as mounting the saw blade and driving it in combination with the device according to the invention.

Further aspects and characteristic features of the invention will be apparent from the following description of preferred embodiments of the invention as well as from the appending claims.

BRIEF DESCRIPTION OF DRAWINGS

In the following description of preferred embodiments of the invention, reference will be made to the accompanying drawings, in which

FIG. 4 is a side view of a composite circular saw blade according to the invention.

FIG. 5 is a section on V—V in FIG. 4.

FIG. 6 is a section on VI—VI in FIG. 4.

FIG. 7 is a side view of the composite circular saw blade according to a second embodiment of the invention.

FIG. 8 is a perspective view of a sawing machine of a general type known in the art; modified in accordance with a third embodiment of the invention.

DESCRIPTION OF PREFERRED EMBODIMENTS

Figure 1:
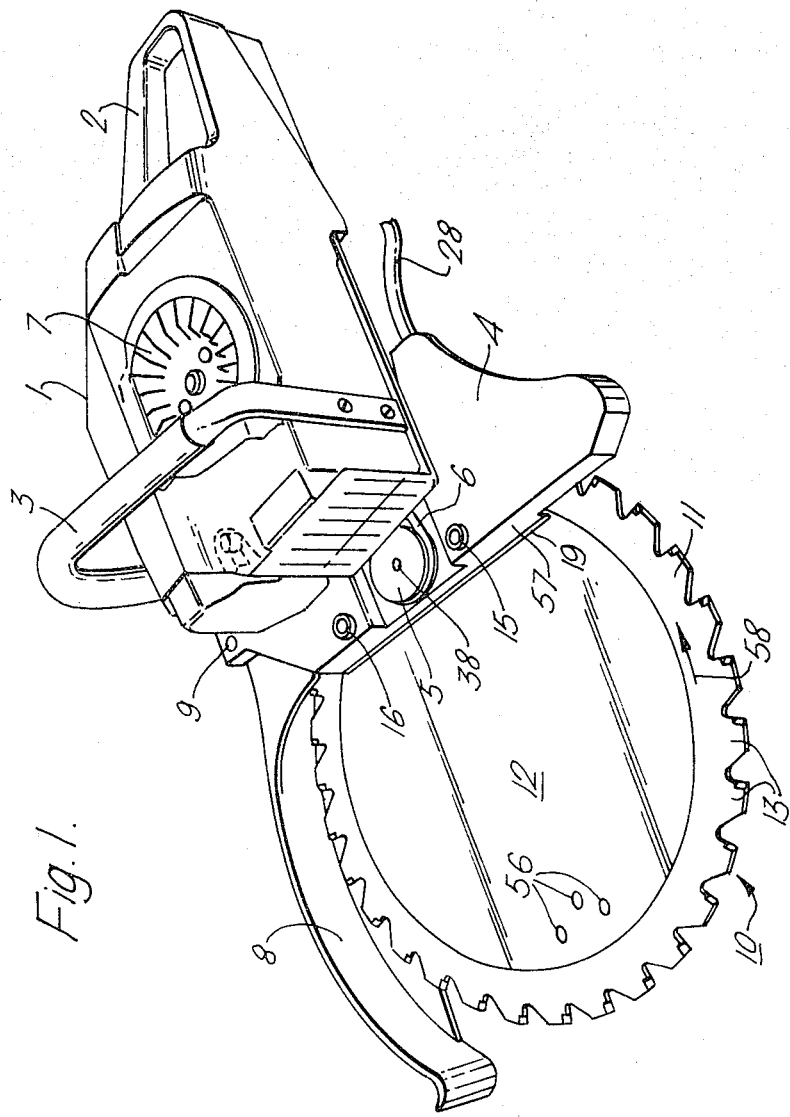
FIG. 1 is a perspective view of a sawing machine according to a first preferred form of embodiment of the invention.
Figure 2:
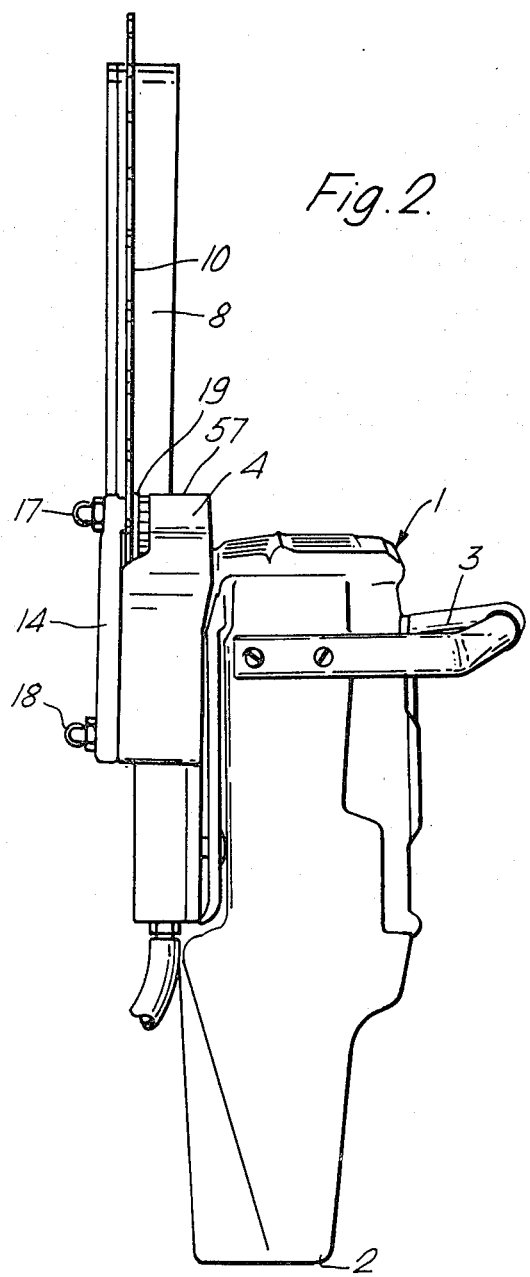
FIG. 2 shows the same machine seen from below.

Referring first to FIG. 1 and FIG. 2, the motor housing of a sawing machine is generally designated by the numeral 1. The motor housing 1 is provided with a pair of handles 2 and 3 and a blade holder 4 is also mounted on the motor housing 1. In the blade holder 4 there is a driving gear 5 with a driving belt 6 connected to a drive motor 7 in the motor housing 1. Also mounted on the blade holder 4 is a blade guard 8 through a joint 9 so that the blade guard can be lowered when sawing to a great depth.

A saw blade is generally designated by 10. This consists of an annular blade 11 and a central disc 12. The front edge 57 of the blade holder 4 determines the maximum sawing depth of the saw blade 10. Teeth on the annular blade 11 are designated by 13. The central disc 12 is mounted in the blade holder 4 by clamping the central disc 12 between the blade holder 4 and a cover 14. A pair of stud bolts 15 and 16 extend through the central disc 12 and the clamping forces are brought about by means of a pair of nuts 17 on the outside of the cover 14. A third stud bolt is disposed outside the periphery of the saw blade 10, not shown, and an associated nut is designated by 18 in FIG. 2. A packing between the blade holder 4 and the central disc 12 is designated by 19.

Figure 3:
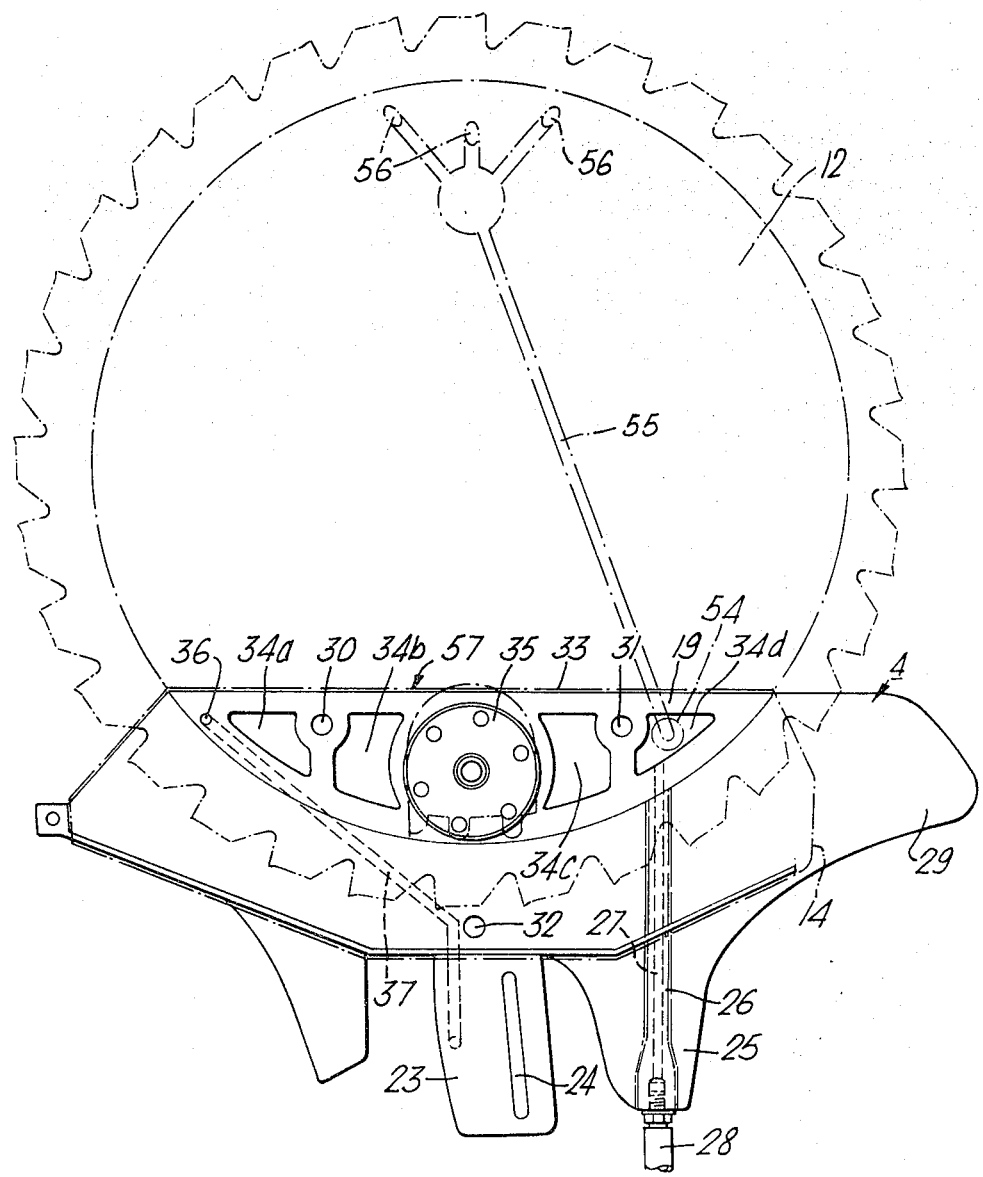
FIG. 3 is a side view of a blade holder included in the sawing machine.

In FIG. 3, the formation of the blade holder 4 is shown more in detail. In FIG. 3, the blade holder 4 is shown in a side view seen in the direction from the cover 14, that is to say in the direction from the left with reference to FIG. 2. A mounting flange is designated by 23. In the mounting flange 23 there is an elongated groove 24 for a stud bolt. As a result of the fact that the groove 24 is elongated, the blade holder 4 can be mounted on the motor housing 1 and the driving belt 6 can be stretched at the same time. Another flange 25 comprises a raised portion 26 which contains a passage 27 for cooling water. A water hose connected to the passage 27 is designated by 28. The projection 29 on the extreme right in FIG. 3 serves as a support for the saw. Recesses in the blade holder 4 for the stud bolts 15 and 16 are designated by 30 and 31 while a hole for the stud bolt belonging to the nut 18 is designated by 32.

FIG. 3 also shows the location of the saw blade 10 when this is mounted between the blade holder 4 and the cover 14. The orientation of the cover 14 in relation to the blade holder 4 is also shown in FIG. 3 by a chain line. Inside the portion of the blade holder 4 facing the central disc 12, that is to say the portion inside the annular blade 11, the blade holder 4 comprises a raised portion 33. The packing 19 has a corresponding shape with a recess for the holes 30 and 31, for the recesses 34a-d, for a cog wheel 35 and for a lubricating hole. The recess in the packing 19 for the lubricating hole is designated by 36. Thus the outside contour of the packing 19 has the form of a segment of a circle which lies entirely within the central disc 12. From the opening 36 for the lubricating hole, a passage 37 leades through the blade holder 4 to the mounting flange 23 and a connection for lubricant. The spindle 38 of the cog wheel 35 is mounted in the blade holder 4 and extends to the driving gear 5 at the other side of the blade holder 4, FIG. 1.

As stated, the saw blade 10 consists of an annular blade 11 and a central disc 12. The central disc 12 in turn consists of three laminations 43, 44 and 45 of which the laminations 43 and 45 constitute outer layers and the lamination 44 an inner layer. The outer laminations 43 and 45 are equally large, while the inner lamination 44 has a somewhat smaller extent. The three laminations are united to one another by spot-welding and/or seam welding. Other methods of uniting the laminations are conceivable, however, such as gluing for example. In this manner an inner disc 12 is obtained with a groove 46 in the outer edge of the central disc 12 between the outer laminations 43 and 45, FIG. 5 and FIG. 6. The annular blade 11 comprises, in its inner edge, a toothed rim with tooth bottoms 48 shaped with a spacing between the tooth bottoms 48 fitting the cogs of the cog wheel 35. The edge portion 49 has a thickness somewhat less than the thickness of the inner lamination 44, that is to say somewhat narrower than the groove 46 in the inner disc 12. The annular saw 11 can therefore be rotated round the annular disc 12 with the edge portion 49 sliding in the groove 46. During the manufacture of the blade, the laminations 43–45 of the central disc 12 are first united to one another, after which the annular blade 11 and the central disc 12 are inseparably united.

The central disc 12 is provided with a number of openings and holes. The largest opening is designated by 50. This opening 50 is intended for the cog wheel 35 and has a width somewhat greater than the width of the gables of the cog wheel. The radial extent is somewhat larger so that the saw blade 10 can be mounted in the blade holder 4 and be pulled over the cog wheel 35. For the mounting, a pair of holes 51 and 52 are further provided for the stud bolts 15 and 16 respectively. The latter hole 52 is somewhat elongated which is also necessitated by the mounting, when the cogs of the cog wheel 35 have to be introduced into the tooth bottoms 48 in the edge portion—the toothed rim—49.

Opposite the mouth of the lubricating passage 37 in the blade holder 4 and the hole 36 in the packing 19, the "lower" lamination of the central disc comprises a lubricating hole 53. The lubricating hole 53 is situated a short distance inside the outer edge of the central disc 12, opposite the groove 46, FIG. 6. When the annular blade 11 is rotated about the central disc 12 in the direction of the arrow 58, oil is thus introduced into the groove 46 and is primarily entrained in small amounts into the regions which are defined by the tooth bottoms 48 and accompanies the groove at least as far as the recess 50 in the central disc. Here a certain amount of lubricant may be lost. This is replaced, however, through the lubricating hole 53 disposed shortly after the recess 50, seen in the direction of rotation.

Inside the groove 46 (with respect to the centre of the disc 12), opposite the recess 34d in the blade holder 4, FIG. 3, which is connected to the cooling water passage 27, the "lower" lamination 43 of the disc 12 and also the central layer 44 comprises a hole 54. From this hole 54 a groove 55 is stamped out of the central layer 44 of the central disc 12, which groove leads to a plurality of openings 56 at the part of the central disc diametrically opposite with respect to the openings 50. These openings, which extend through the two outer laminations 43 and 45, are designated by 56. Preferably at least some of these openings 56 are directed so that the cooling water which is introduced through the hole 54 and which is conveyed through the passage 55 is caused to spray towards the teeth 13 of the saw blade to cool these and to cooperate in cooling the teeth and flushing away sawdust from the kerf produced by the saw blade. This function of the saw blade is intended to occur primarily in saw blades equipped with diamonds but may also occur in other blades. Apart from said openings in the central disc 12, this does not have any other openings in this form of embodiment. In itself, however, it is possible, without exceeding the principles of the invention, to remove material in the middle of the central disc.

Referring now to FIG. 7 a saw blade is generally designated by 10'. This consists of an annular blade 11 and two central disc portions 12a and 12b. The front edge 57 of the blade holder 4, indicated by dashed lines, determines the maximum sawing depth of the saw blade 10'. The teeth of the annular blade 11 are designated by 13. The first disc portion 12b seen in the direction of rotation of the annular blade 11 is mounted in the blade holder 4 by gripping said disc portion 12b between the blade holder 4 and a cover, not shown, on the opposite side of the saw blade in a manner corresponding to the previous embodiment described with reference to FIGS. 1–6. The disc portion 12a is not locked, however, in relation to the blade holder 4 and therefore not in relation to the disc portion 12b. The disc portion 12a can therefore execute movements in relation to the blade holder 4 by turning about a stud extending through a substantially arcuate hole 51' in the other disc portion 12a and by displacement in the hole 51'.

The disc portions 12a and 12b are united to one another on the one hand by the blade holder 4, and on the other hand by a joint 63 in the end of the disc portion remote from the blade holder. The joint 63 consists of an "single-plane, double ball-and-socket joint". A groove 62 is milled in the inner edge of the disc portions 12a and 12b. Disposed in this groove is a spring 73 which tends to return to its original straight shape. As the groove, corresponding to groove 46 in the foregoing embodiment, in the outer edge of the disc portions 12a and 12b and/or in the inner edge of the annular blade 11 becomes worn, the springs 73 press out the disc portion 12a towards the annular blade 11, as a result of which the annular blade 11 is also pressed against the opposite, locked disc portion 12b. The necessary displacement of the disc portion 12a is brought about by movement in the joint 63 and by displacement of the disc portion 12a in relation to the blade holder 4 made possible by the oval hole 51'.

The saw blade shown also comprises a lubricating hole 36 for supplying lubricating oil to the groove 46' in the same manner as in the saw blade according to the foregoing embodiment. Furthermore, in accordance with the invention, there is a connection in the blade holder, not shown, for flushing liquid to a hole 54' in the movable disc portion 12a and hence to a passage 55' through the movable disc portion 12a ending in a pair of openings 56' in the front portion of the saw blade. The flushing liquid is supplied particularly when sawing concrete and the like with saw blades equipped with diamonds to cool the diamond segment and to flush away the material sawn off. Apart from this, reference should be made to the description of the foregoing embodiment for the parts of the construction which have correspondence in this embodiment.

Turning now to FIG. 8 the motor housing 101 is provided with a blade holder 104. The blade holder 104 holds the annular saw blade 110 between three pairs of rollers 105 and 106 in a manner known per se. The former rollers 105 are driving rollers and the other rollers 106 are supporting and guiding rollers.

The blade holder 104 also in a manner known per se holds a central disc 112 which is spaced away from the inner edge of the annular blade 110 by a narrow space 103. A water hose 128 is connected to the blade holder 104 and communicates with a conduit 154 between the blade holder and the outer edge of the central disc 112.

In the disc 112 passages 155 and 156 are provided. The passage 155 terminates in the outer edge of the disc 112 approximately opposite to the blade holder 104 for the supply of cooling and fluching water to the saw kerf the discharge openings being designated 157, while the passage 156 terminates in the edge of the disc just in front of the blade holder in order to flush away remaining saw dust such that it will not enter into the driving assembly.

I claim:

1. Device relating to a circular saw blade of centerless type with a sawing depth greater than the radius of the circle, comprising an annular blade and at least one central disc provided inside the annular blade, characterized in that said central disc contains at least one conduit or passage for a fluid, e.g. for a coolant or a flushing agent to the part of the disc which lies within the region of the maximum sawing depth.

2. Device according to claim 1, characterized in that said conduit or passage extends through the disc in a plane which is parallel to its side surfaces from a first point outside the region of the maximal sawing depth to a second point which lies within said region, that the disc in said first point has an inlet to the passage through the disc and in said second point has an outlet for said fluid, e.g. for the transportation of a coolant or a flushing agent in situ into the kerf produced by the saw blade.

3. Device according to claim 1 or 2, characterized in that the central disc consists of a laminated material comprising at least two united laminations (43–45), and that the said passage is obtained by a groove provided in one of the laminations prior to uniting the laminations.

4. Device according to claim 3, characterized in that the number of laminations is at least three, and that said groove is provided in an inner layer of the laminated material.

5. Device according to claim 3, characterized in that the number of laminations is two and that said groove is provided in one of the laminations in that side surface which is faced to the other lamination.

6. Device according to one of claims 1 and 2, characterized in that the conduit or passage consists of a tube provided in a groove in the disc, and that the tube has an outer dimension in the direction perpendicular to the side surface of the disc which is not greater than the depth of the groove.

7. Device according to one of claims 1 and 2, characterized in that the conduit or passage is formed by means of a strip or corresponding means covering a groove provided in one of the side surfaces of the disc.

8. Device according to one of claims 1 or 2, characterized by mounting means (4, 14) provided to hold the central disc, and a conduit extending through said mounting means to said inlet of the conduit or passage in the central disc for the supply of said fluid to said conduit or passage.

9. Device according to claim 8, characterized in that sealing means are provided between the mounting means and the central disc around an inlet hole.

10. Device according to any one of claims 1 or 2, characterized in that said outlet is provided in the part of the disc which lies diametrically opposite the mounting means.

* * * * *